UNITED STATES PATENT OFFICE.

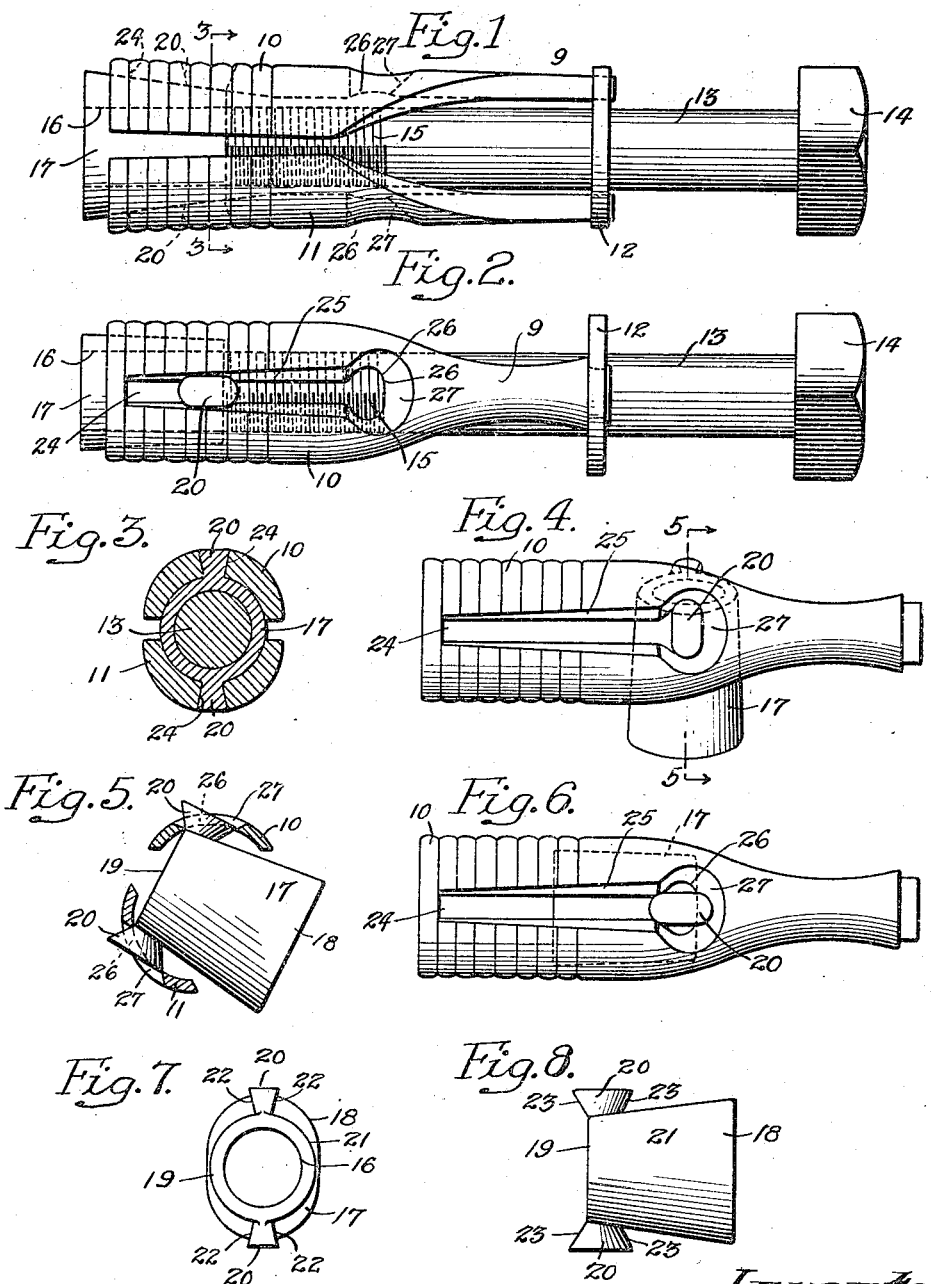

DWIGHT W. BENNETT, OF PHILADELPHIA, PENNSYLVANIA.

EXPANSION-BOLT.

1,281,272.         Specification of Letters Patent.    Patented Oct. 15, 1918.

Application filed May 7, 1918. Serial No. 232,996.

*To all whom it may concern:*

Be it known that I, DWIGHT W. BENNETT, a citizen of the United States, residing at Philadelphia, in the county of Philadelphia and State of Pennsylvania, have invented certain new and useful Improvements in Expansion-Bolts, of which the following is a specification.

My invention relates to expansion bolts of the same general type as shown and described in my United States Patents Nos. 674,074 and 694,345 in which a spring sleeve is employed, said spring sleeve being expanded due to the action of a tapered nut which is movable longitudinally, relatively to the inner surface of the sleeve, by a bolt. While the expansion bolts of my above mentioned patents are practical in use, great inconvenience and difficulty has often arisen due to the fact that the above mentioned tapered nut often becomes distorted or moved out of axial alinement with the sleeve and in some cases has entirely become detached from the sleeve rendering it difficult and sometimes impossible to remove the expansion bolt after it has once been inserted in a wall or other structure.

One object of my present invention is to provide a construction which will eliminate this fault and inconvenience in expansion bolts of the above type.

Another object is to make the expansion bolt of my present invention of a comparatively simple construction and so that it can be readily made and assembled.

These objects, and other advantageous ends which will be described hereinafter, I attain in the following manner, reference being had to the accompanying drawings in which—

Figure 1 is a side elevation of my improved expansion bolt,

Fig. 2 is a top plan view of Fig. 1,

Fig. 3 is a transverse section taken on the line 3—3 of Fig. 1,

Fig. 4 is a top plan view of one of the spring sleeve sections showing the position in which it is necessary to move the expansion nut in order to attach the latter to the sections of the spring sleeve, Fig. 5 is a section taken on the line 5—5 of Fig. 4 and showing in dot-and-dash lines the relative position of the other spring section of the sleeve when the expansion nut is being attached thereto, Fig. 6 is a top plan view of the spring sleeve with the expansion nut located therein and ready to have a connecting collar secured to the ends of the spring sleeve sections to resiliency hold them together,

Fig. 7 is an end view of my improved expansion nut, and

Fig. 8 is a side view of the expansion nut shown in Fig. 7.

Referring to the drawings, a spring sleeve 9 is made in two sections 10 and 11. These sections are joined together preferably by riveting thereto a collar 12, this collar having a hole therein through which extends an expansion bolt 13, the latter having an angular head 14 at its outer end and being screw threaded at 15 at its inner end. Said screw threaded end of the bolt projects into the sleeve 9 and is adapted to engage a screw threaded hole 16 in an expansion nut
17. This expansion nut is made elliptical in cross section adjacent one end as shown at 18 and tapers toward its opposite end 19, the cross section of the nut gradually changing from an elliptical form throughout the tapering to a circular form at its opposite end so that the end 19 is substantially circular in cross section.

The inner surfaces of the respective sections of the spring sleeve 9 conform to the general taper and elliptical cross section of the expansion nut so that said nut is prevented from rotating within the sleeve 9 but when pulled therein due to the turning of the bolt 13 it will serve to expand or separate the sections 10 and 11 of the spring sleeve and therbey firmly secure the spring sleeve 9 within a hole in a wall or other structure. The expansion nut is provided with diametrically disposed lateral lugs 20. These lugs taper toward the body portion 21 of the nut at their sides 22 and at their opposite ends 23.

Each of the sections 10 and 11 of the spring sleeve 9 has a longitudinally extending slot 24, said slot terminating at opposite ends within the length of said sleeve sections. The major portions 25 of the length of said slots 24 have their side walls flaring outwardly at substantially the same angle as the taper of the sides 22 of the lugs 20, and these lugs 20 project through the slots 24 and slidably fit against said tapered side walls of the portions 25 of the slots 24.

The ends of the slots which are nearest to the collar 12 are made of greater width than the innermost parts of the major portions 24 so that enlarged portions 26 are formed in said slots. The walls 27, forming these enlargements 26 of the slots 24, flare outwardly from the inner surface of the sleeve sections 10 and 11. The length of the enlargements 26 of the slots 24, taken in the direction of the length of the spring sleeve 9, is less than the length of the lugs 20 so that it is impossible to separate the expansion nut 17 from the sleeve sections, even though the lugs 20 are moved into the enlargements 26 of said slots 24, while the axis of the expansion nut 17 is in alinement with the axis of the sleeve 9.

Furthermore, the tapered ends 23 of the lugs fit against the flared walls 27 of the slot and thereby form a lock against lateral movement of the expansion nut in the direction of a plane passing through the slots 24. Thus while the collar 12 is secured to the sections 10 and 11 of the spring sleeve 9, it is impossible for the expansion nut to get out of proper alinement with the expansion sleeve and the expansion nut is always in position, either to receive the expansion bolt 13 or a bar or other device which is inserted into the sleeve 9 through the hole in the collar 12.

The expansion nut is attached to the sections 10 and 11 of the spring sleeve 9 before the collar 12 is secured to the ends of said sections and the construction is such that the expansion nut must be turned with its axis at an angle to the length of the sections and also tilted into the position shown in Fig. 5 so that one end of each lug 20 is first projected into the enlargement 26 of the slot in the direction of the width thereof and then turned so that the entire outer portions of the lugs will be pushed through the enlargement. After the lugs have been thus pushed through the enlargement of the slots 24, the expansion nut is turned into the position shown in Fig. 6 and can then be slid toward the opposite end of the slot, and when in this latter position, the collar 12 can be riveted or secured to the sections 10 and 11 of the spring sleeve as shown in Figs. 1 and 2.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. An expansion bolt including an expansion sleeve having sections adapted to be separated; an expansion nut movable into said sleeve to separate said sections to various extents, said sections having elongated slots therein including enlargements extending transversely to the length of said slots; and lugs on said expansion nut and of greater length than the length of said enlargements whereby the lugs must be moved into said enlargements and then turned in a transverse direction in order to be moved through said enlargements, substantially as described.

2. An expansion bolt including an expansion sleeve having sections adapted to be separated; an expansion nut movable into said sleeve to separate said sections to various extents, said sections having elongated slots therein including enlargements extending transversely to the length of said slots; and lugs on said expansion nut and of greater length than the length of said enlargements whereby the lugs can be moved into said enlargements and then turned in a transverse direction in order to bring the length of said lugs in alinement with the width of said slot enlargements; said slots, including the enlargements, having walls flaring outwardly, said lugs being tapered inwardly on their sides and ends whereby the expansion nut, after having been transversely moved, must be tilted to move the lugs through the enlargements of said slots, substantially as described.

3. An expansion bolt including an expansion sleeve having sections adapted to be separated; an expansion nut movable into said sleeve to separate said sections to various extents, said sections having elongated slots therein including enlargements extending transversely to the length of said slots; and lugs on said expansion nut and of greater length than the length of said enlargements whereby the lugs can be moved into said enlargements in the direction of the length of said sleeve without being movable therethrough, said enlargements of the slots being of less width than the length of said lugs at their outermost portions, said lugs being tapered inwardly at their ends whereby, when the length of the expansion nut is turned transversely to the length of the sleeve and tilted, said lugs can be moved through said enlargements and free of the sections of said sleeve when the latter are disconnected, substantially as described.

In testimony whereof I have signed my name to this specification in the presence of two subscribing witnesses.

DWIGHT W. BENNETT.

Witnesses:
CHAS. E. POTTS,
MAY A. INGLAR.

Copies of this patent may be obtained for five cents each, by addressing the "Commissioner of Patents, Washington, D. C."